(12) United States Patent
Johnson et al.

(10) Patent No.: US 8,819,494 B2
(45) Date of Patent: Aug. 26, 2014

(54) AUTOMATICALLY CHANGING PARTS IN RESPONSE TO TESTS

(75) Inventors: Todd E. Johnson, Chatfield, MN (US);
Frederick A. Kulack, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/968,472

(22) Filed: Dec. 15, 2010

(65) Prior Publication Data

US 2012/0159247 A1    Jun. 21, 2012

(51) Int. Cl.
*G06F 11/00* (2006.01)

(52) U.S. Cl.
USPC ............................................ 714/38.1

(58) Field of Classification Search
CPC ................................................... G06F 11/362
See application file for complete search history.

(56) References Cited

U.S. PATENT DOCUMENTS

| | | | |
|---|---|---|---|
| 5,583,988 A * | 12/1996 | Crank et al. | 714/48 |
| 6,279,124 B1 * | 8/2001 | Brouwer et al. | 714/38.11 |
| 8,095,823 B2 * | 1/2012 | Griffith et al. | 714/16 |
| 8,151,248 B1 * | 4/2012 | Butler et al. | 717/124 |
| 8,276,126 B2 * | 9/2012 | Farnham et al. | 717/131 |
| 8,413,117 B1 * | 4/2013 | Coughlan et al. | 717/124 |
| 8,468,503 B2 * | 6/2013 | Grosse et al. | 717/131 |
| 8,489,929 B2 * | 7/2013 | Lam et al. | 714/38.1 |
| 2004/0015860 A1 * | 1/2004 | Craft et al. | 717/122 |
| 2005/0229045 A1 * | 10/2005 | Tamakoshi | 714/38 |
| 2009/0138853 A1 * | 5/2009 | Orrick | 717/124 |

OTHER PUBLICATIONS

Rational Functional Tester, http://ww-01.ibm.com/software/awdtools/tester/functional, Jun. 8, 2010, pp. 1-3, printer Dec. 15, 2010.
Bret Pettichord, Success with Test Automation, http://www.io.com/~wazmo/succpap.htm, Jun. 28, 2001, pp. 1-8.
Test Automation, Wikipedia, http://en.wikipedia.org/w/index.php?title=Test_automation&printable=yes, printed Dec. 15, 2010, pp. 1-4.

* cited by examiner

*Primary Examiner* — Michael Maskulinski
(74) *Attorney, Agent, or Firm* — Owen J. Gamon; Roy W. Truelson

(57) ABSTRACT

In an embodiment, in response to an error encountered by a test of a program, a rule is found that specifies the error and an action. A part in the program is selected in response to the action, the part is modified, and the test is re-executed. In various embodiments, the part is modified by changing the code in the part or by replacing the part with a previous version of the part.

15 Claims, 9 Drawing Sheets

| | RULES 158 | |
|---|---|---|
| ERROR 320 | ACTIONS 322 | |
| NULL POINTER EXCEPTION | 1. FIND POINTER THAT CAUSED NPE. SEARCH FOR INITIALIZATION OF THE POINTER. ADD THE INITIALIZATION TO THE PART PRIOR TO THE CODE THAT CAUSES THE EXCEPTION. 2. REPLACE THE PARTS FIXED BY A PROBLEM REPORT. 3. CREATE A NEW PROBLEM REPORT. | 302 |
| UNCATEGORIZED | 1. REPLACE ALL CHANGE FLAGGED PARTS. 2. REPLACE CHANGE FLAGGED PARTS ONE-AT-A-TIME. 3. CREATE PROBLEM REPORT. IN RESPONSE TO THE PROBLEM REPORT BEING FIXED, CREATE A NEW RULE THAT IDENTIFIES THE ERROR AND AN ACTION TO REPLACE THE PARTS. | 304 |
| OUT OF MEMORY | 1. REPLACE CHANGE FLAGGED PARTS ONE FUNCTION AT A TIME. 2. SEARCH PARTS FOR CODE THAT MAKES LARGE MEMORY ALLOCATIONS AND CHANGE THE CODE TO USE LESS MEMORY. 3. CREATE A NEW PROBLEM REPORT. | 306 |
| CLASS CAST EXCEPTION | 1. CHANGE THE PART THAT CASTED THE CLASS TO USE A DIFFERENT CLASS NAME. 2. CREATE A NEW PROBLEM REPORT. | 308 |

RULES (158)

| ERROR (320) | ACTIONS (322) | |
|---|---|---|
| NULL POINTER EXCEPTION | 1. FIND POINTER THAT CAUSED NPE. SEARCH FOR INITIALIZATION OF THE POINTER. ADD THE INITIALIZATION TO THE PART PRIOR TO THE CODE THAT CAUSES THE EXCEPTION. 2. REPLACE THE PARTS FIXED BY A PROBLEM REPORT. 3. CREATE A NEW PROBLEM REPORT. | 302 |
| UNCATEGORIZED | 1. REPLACE ALL CHANGE FLAGGED PARTS. 2. REPLACE CHANGE FLAGGED PARTS ONE-AT-A-TIME. 3. CREATE PROBLEM REPORT. IN RESPONSE TO THE PROBLEM REPORT BEING FIXED, CREATE A NEW RULE THAT IDENTIFIES THE ERROR AND AN ACTION TO REPLACE THE PARTS. | 304 |
| OUT OF MEMORY | 1. REPLACE CHANGE FLAGGED PARTS ONE FUNCTION AT A TIME. 2. SEARCH PARTS FOR CODE THAT MAKES LARGE MEMORY ALLOCATIONS AND CHANGE THE CODE TO USE LESS MEMORY. 3. CREATE A NEW PROBLEM REPORT. | 306 |
| CLASS CAST EXCEPTION | 1. CHANGE THE PART THAT CASTED THE CLASS TO USE A DIFFERENT CLASS NAME. 2. CREATE A NEW PROBLEM REPORT. | 308 |

FIG. 3

PROBLEM REPORTS (160)

| ERROR (410) | CHANGE FLAG (420) | |
|---|---|---|
| NULL POINTER EXCEPTION | CHANGE FLAG B | 402 |
| FILE C NOT FOUND | | 404 |

FIG. 4

AUTOMATICALLY CHANGING PARTS IN RESPONSE TO TESTS

FIELD

An embodiment of the invention generally relates to computer systems and more particularly to test automation for computer systems.

BACKGROUND

Computer systems typically comprise a combination of computer programs and hardware, such as semiconductors, transistors, chips, circuit boards, storage devices, and processors. The computer programs are stored in the storage devices and are executed by the processors. To ensure the accuracy and reliability of computer programs, they are often tested using an automatic process that executes testcases against the computer programs, sending commands or requests and data to the programs and comparing the received responses to expected responses.

Because of the size and complexity of the computer programs, they are often stored in version control systems and assigned unique version identifiers to unique states of the computer programs. Further, within a particular version, change flags, change codes, or tags are assigned to changes, fixes, updated functions, or new developments that are added to the version. The process of adding change flags to programs is sometimes called revision control, which provides control, documentation, and/or tracking of changes. The change flags are often implemented as comments or other non-executable symbols that identify a statement, instruction, function, or other group of code. The change flags may identify the person who made the change, the code that was changed, the date of the change, and the reason for making the change, such as fixing a specified error or adding a particular function. Change flags may provide a way to identify or remove changes to the programs if the need arises.

SUMMARY

A method, computer-readable storage medium, and computer system are provided. In an embodiment, in response to an error encountered by a test of a program, a rule is found that specifies the error and an action. A part in the program is selected in response to the action, the part is modified, and the test is re-executed. In various embodiments, the part is modified by changing the code in the part or by replacing the part with a previous version of the part.

BRIEF DESCRIPTION OF THE SEVERAL VIEWS OF THE DRAWINGS

FIG. 3 depicts a block diagram of an example data structure for rules, according to an embodiment of the invention.

FIG. 4 depicts a block diagram of an example data structure for problem reports, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
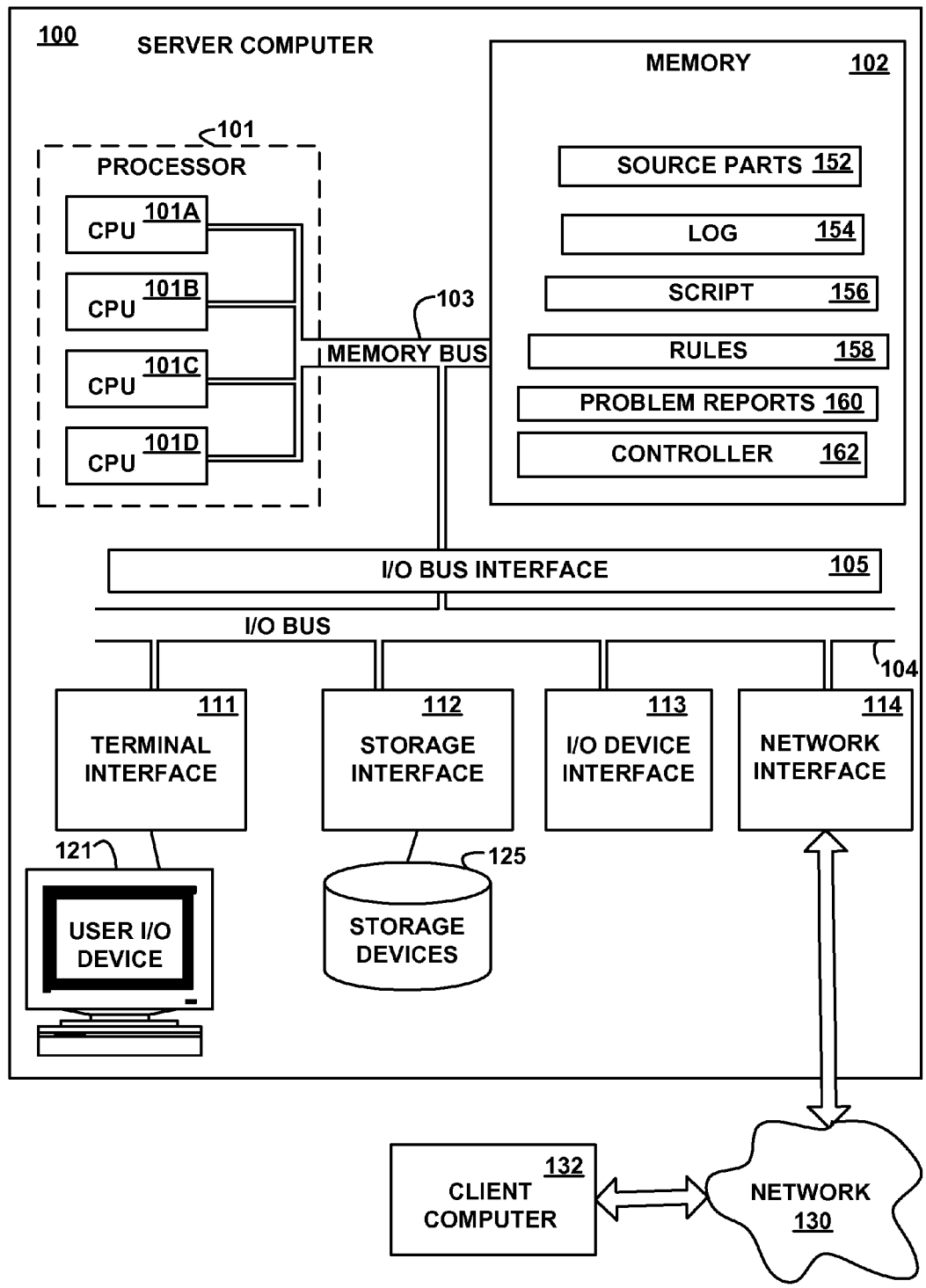
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is encoded with or stores source parts 152, a log file 154, a script 156, rules 158, problem reports 160, and a controller 162. Although the source parts 152, the log file 154, the script 156, the rules 158, the problem reports 160, and the controller 162 are illustrated as being contained within the memory 102, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, the source parts 152, the log file 154, the script 156, the rules 158, the problem reports 160, and the controller 162 are not necessarily all completely contained in the same storage device at the same time. Further, although the source parts 152, the log file 154, the script 156, the rules 158, the problem reports 160, and the controller 162 are illustrated as being separate entities, in other embodiments some of them, portions of some of them, or all of them may be packaged together.

In an embodiment, the source parts 152, the script 156, and the controller 162 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, 9, 10, and 11. In another embodiment, the script 156 and/or the controller 162 are implemented in hardware via semiconductor devices, chips, logical gates, circuits, circuit cards, and/or other physical hardware devices in lieu of, or in addition to, a processor-based system. In an embodiment, the source parts 152, the script 156, and/or the controller 162 comprise data in addition to instructions or statements.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, radio frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function (s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
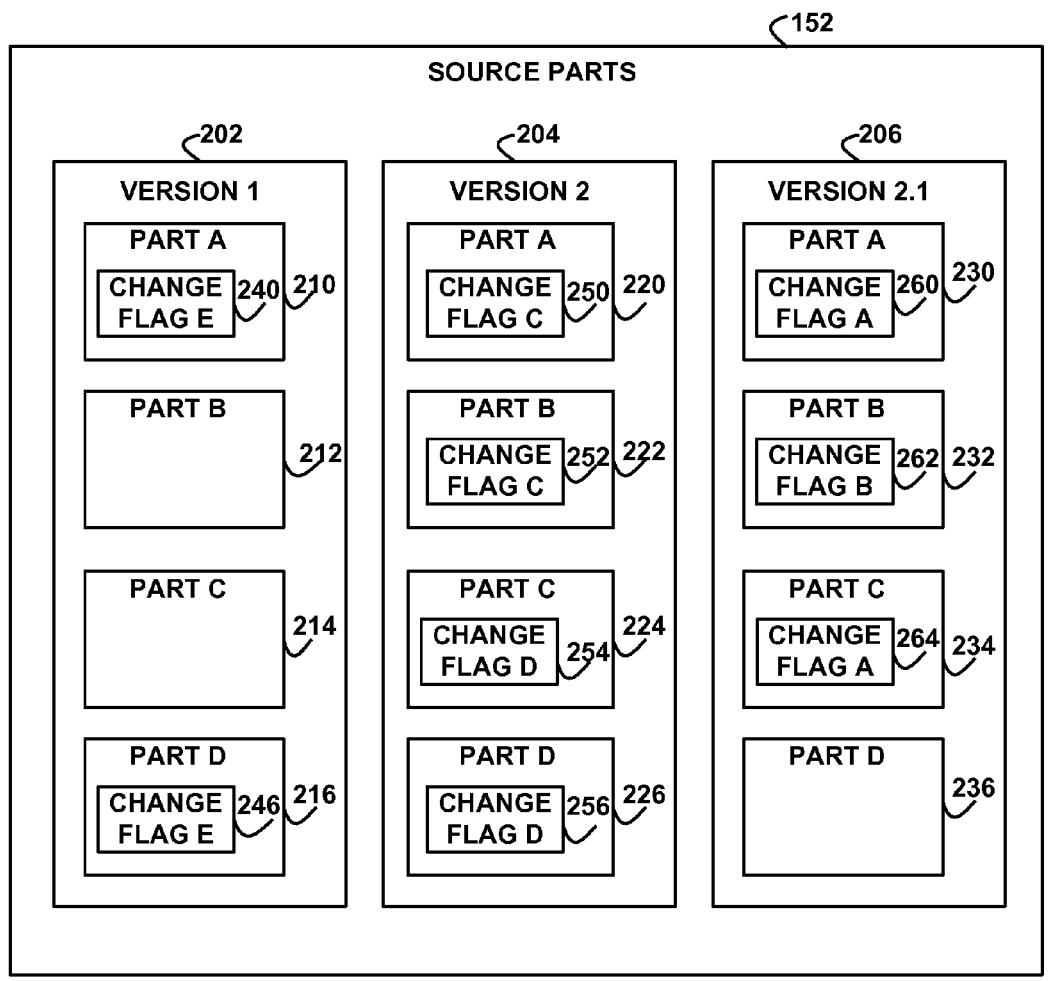
FIG. 2 depicts a block diagram of an example data structure for source parts, according to an embodiment of the invention.

FIG. 2 depicts a block diagram of an example data structure for source parts 152, according to an embodiment of the invention. The source parts 152 comprise example versions 202, 204, and 206 of a computer program or programs. The version 202 comprises example parts 210, 212, 214, and 216. The part 210 comprises an example change flag 240, and the part 216 comprises an example change flag 246. The version 204 comprises example parts 220, 222, 224, and 226. The part 220 comprises an example change flag 250, the part 222 comprises an example change flag 252, the part 224 comprises an example change flag 254, and the part 226 comprises an example change flag 256. The version 206 comprises example parts 230, 232, 234, and 236. The part 230 comprises an example change flag 260, the part 232 comprises an example change flag 262, and the part 234 comprises an example change flag 264.

The version 202 is a prior version of the version 204, which is a prior version of the version 206. The version 204 was created by making changes, additions, or deletions (or any combination thereof) to the version 202, and the version 206 was created by making changes, additions, or deletions (or any combination thereof) to the version 204. In various embodiments a prior version was created before a later version, was released, sold or licensed prior to a later version, or changes were made to the prior version, in order to create the later version.

The change flags 240, 246, 250, 252, 254, 256, 260, 262, and 264 document the changes/additions/deletions that were made to the versions, in order to create the later version from the prior version. The change flags are assigned to changes, fixes, deletions, updated functions, or new developments that are added to the version. In various embodiments, the change flags may be implemented as comments or other non-executable symbols that identify a line, statement, instruction, function, or other group or entity of code or subset of a part. The change flags may identify the person who made the change or addition, the code that was changed/added/deleted, the date of the change, and the reason for making the change, such as fixing a specified error or adding a specified function. The same change flag may identify multiple units of code within a part and may identify multiple parts. Although the change flags are illustrated as being within the parts, in another embodiment, the change flags are external to the parts and are managed by a versioning system.

FIG. 3 depicts a block diagram of an example data structure for rules 158, according to an embodiment of the invention. The rules 158 comprise example records 302, 304, 306, and 308, each of which comprises an example error field 320 and an example actions field 322. The error field 320 specifies an identifier of an error, exception, or problem that may be encountered during the execution of the source parts or may be reported by the execution of the source parts. The actions 322 are assigned to the error 320 in the same record and specify one or more actions, steps, processes, methods, or modules, procedures or functions to be invoked, in response to the occurrence of the error in the same row, or any portion, combination, or multiple thereof. In an embodiment, the controller 162 performs the actions in each record 302, 304, 306, and 308 sequentially, in the specified order, re-executing the script 156, or a portion of the script 156, after each action that modifies a part or replaces a part with a previous version of the part, until all actions are complete or until the error no longer occurs. In this way, in an embodiment, the controller finds information about the error, such as the part, function within the part, code within the part, or change that was made to the part that is the source or cause of the error. The rules, errors, and actions illustrated are examples only, and in other embodiments, any appropriate rules and actions may be used.

The record 302 comprises an example error 320 of a null pointer exception and the example actions 322 of:
1) finding pointer-access-code in a part that was executing when the null pointer exception occurred; finding a pointer in that pointer-access-code, a read of which caused the null pointer exception because the pointer was uninitialized (null); searching for initialization code in another location (the same or a different part) that initializes the pointer (sets the pointer to a value); and adding the found initialization code prior to the pointer-access-code that read the pointer and caused the exception;
2) replacing the parts identified with a change flag 420 in a problem report record (with an error that matches the null pointer exception) with the corresponding parts having the same name in the previous version; and
3) creating a new problem report record that identifies the null pointer exception in the error field 410.

The record 304 comprises an example error 320 of an uncategorized error. If an error occurs during the execution of the script 156 that does not match any other error 320 in the rules 158, then the controller 162 selects the example record 304 with the uncategorized error 320 and deems the uncategorized error to be the encountered error. The record 304 further comprises the example actions 322 of:
1. finding a change flag in a part that was executing at the time of the error and replacing all of the parts or portions of parts that are identified by that change flag with their corresponding part or portion (having the same name) in the previous version;
2. finding a change flag in a part that was executing at the time of the error, finding all of the parts or portions of parts that are identified by that change flag, and finding the corresponding parts/portions with the same name in the previous version; replacing the parts/portions that have the change flag in the current version with their corresponding part/portion from the previous version, one-at-a-time, re-executing the script 156 on the resultant modified current version after each one-at-a-time replacement; and determining if the error still occurs, until all such parts have been replaced or the error no longer occurs; and 3. creating a new record in the problem reports 160 with an error 410 that identifies the error 320 in the record 304; in response to fixes being made to the parts that are identified by a change flag and the problem report record being updated with the change flag, creating a new record in the rules 158 that identifies the error and an action 322 to replace the parts identified by the change flag with the corresponding parts of the same name from the previous version.

The record 306 comprises an example error 320 of an out of memory error and the example actions 322 of:
1. finding a change flag in a part that was executing at the time of the error, finding all functions in the parts that are identified by that change flag, and finding the corresponding functions and parts with the same names in the previous version; replacing the functions that have the change flag in the current version with their corresponding function from the previous version, one-at-a-time, re-executing the script 156 on the resultant modified current version after each replacement; and determining if the error still occurs, until all such functions have been replaced or the error no longer occurs;
2. searching the parts for code that makes large memory allocations (allocates more memory than a threshold amount); if code is found that allocates a large amount of memory, changing the code to allocate less memory and re-executing the script 156; and
3. creating a new record in the problem reports 160 that identifies the out of memory error.

The record 308 comprises an example error 320 of a class cast exception. A class cast exception occurs when code in a part attempts to cast or assign an object of one type to an object of another, incompatible, type. For example, in an embodiment, an object having a string type is incompatible with an object having an integer type, so execution of code that attempts to assign the contents of an object with the string type to the storage location of an object having the integer type results in a class cast exception error. The record 308 further comprises the example actions 322 of:
1. changing code in the part that casted the class that caused the error to use a different class name (a recast action); and
2. creating a new record in the problem reports 160 that identifies the class cast exception.

FIG. 4 depicts a block diagram of an example data structure for problem reports 160, according to an embodiment of the invention. The problem reports 160 comprise example records 402 and 404, each of which comprises an example error field 410 and an example change flag field 420. The error field 410 identifies an error that execution of the source parts by the script 156 encountered. The change flag field 420 specifies a change flag or change flags that identify changes in the source part that fixed the error identified in the same record. If the change flag 420 has empty contents, then the error 410 in the same record has not been fixed.

Figure 5:
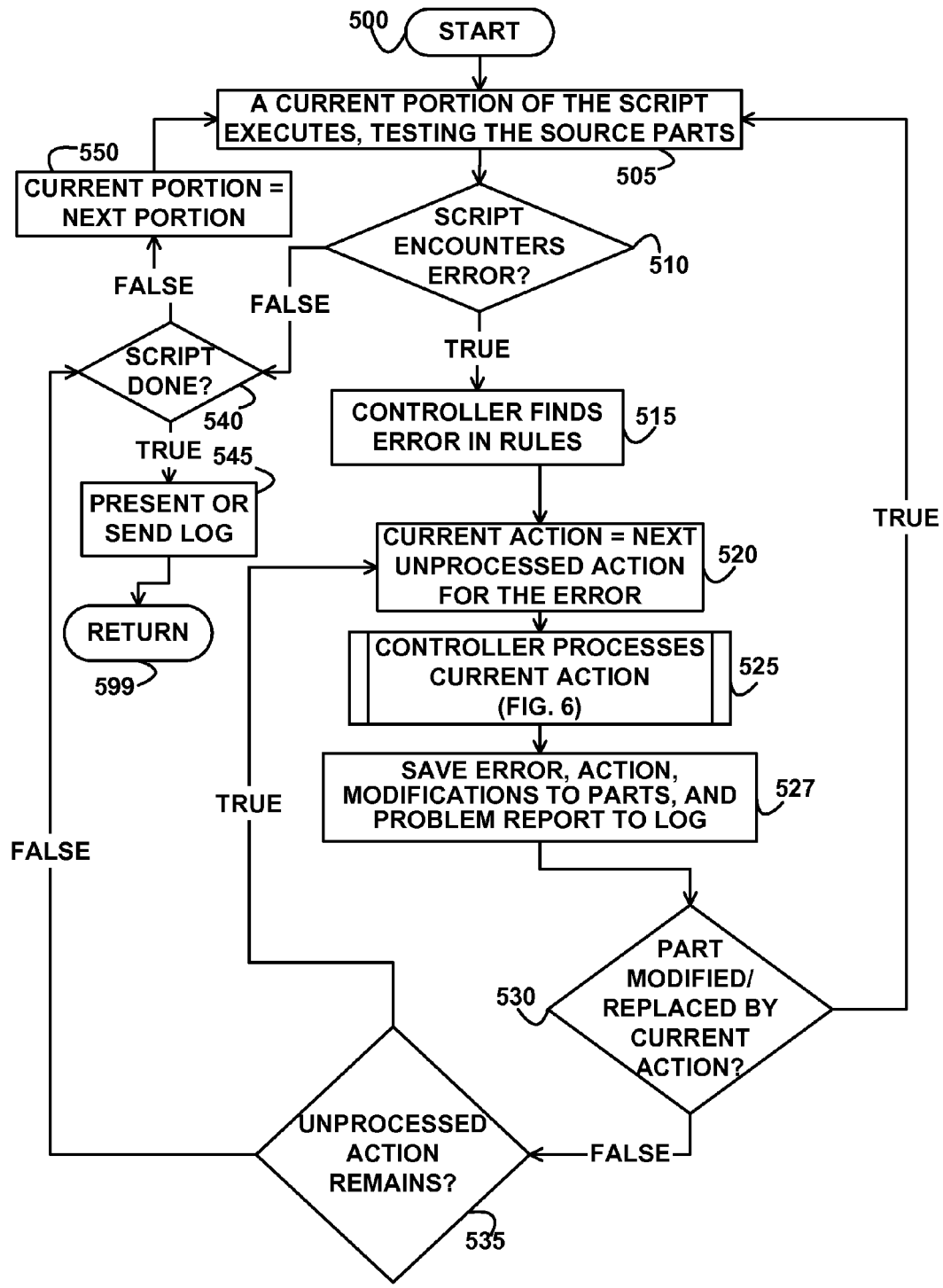
FIG. 5 depicts a flowchart of example processing for testing source parts of a program or programs, according to an embodiment of the invention.

FIG. 5 depicts a flowchart of example processing for testing source parts of a program or programs, according to an embodiment of the invention. Control begins at block 500. Control then continues to block 505 where a current portion of the script 156 executes, testing the functions or operations of the source parts. In an embodiment, the script 156 sends commands, requests, parameters, data, or any multiple or combination thereof, to the source parts, receives responses from the source parts, and compares the received responses to expected responses. Control then continues to block 510 where the controller 162 determines whether the script 156 has encountered an error by comparing a received response from the source parts to an expected response specified by the script 156. If the determination at block 510 is true, then script 156 has encountered an error, and the received response does not match (is not identical to) the expected response, so control continues to block 515 where the controller 162 finds the error in the rules 158. That is, the controller 162 finds a record in the rules 158 with an error field 320 that matches the response returned by the source parts. If the returned response does not match any of errors 320 in any of the records, then the controller 162 selects the example record 304 with the "uncategorized" error 320 and deems the uncategorized error to be the matched error.

Control then continues to block 520 where the controller 162 sets the current action to be the next unperformed action in the same record of the rules 158 as the matched error. Control then continues to block 525 where the controller 162 processes or performs the current action, as further described below with reference to FIG. 6. Control then continues to block 527 where the controller 162 saves the error encountered, the action processed, an identification of any part that was modified or replaced, any code that was modified or replaced, an identifier of any problem report record that was created, or any combination thereof, to the log file. Control then continues to block 530 where the controller 162 determines whether a source part was modified or replaced by the processing of the current action. If the determination at block 530 is true, then a source part was modified or replaced by the processing of the current action, so control returns to block 505 where the script 156 re-executes the current portion of the script 156, testing the modified or replaced source parts, as previously described above.

If the determination at block 530 is false, then the controller 162 did modify or replace the source parts using the current action, so control continues to block 535 where the controller 162 determines whether any unprocessed action remains in the record whose error matches the error encountered by the execution of the source parts by the script 156. If the determination at block 535 is true, then an unprocessed action remains whose error matches the encountered error, so control returns to block 520 where the controller 162 changes the current action to be the next unprocessed action specified by the rules record that identifies the encountered error, as previously described above. If the determination at block 535 is false, then no unprocessed action remains and all of the actions have been processed that are specified by the rules record that identifies the encountered error, so control continues to block 540 where the controller 162 determines where the script 156 is done testing the source parts. If the determination at block 540 is true, then the script 156 is done testing the source parts, so control continues to block 545 where the controller 162 presents or displays the log 154 via the user I/O device 121 or sends the log file to an application that executes on the processor 101 or on the client computer 132. Control then continues to block 599 where the logic of FIG. 5 returns. If the determination at block 540 is false, then the script 156 is not done testing the source parts, so control continues to block 550 where the controller 162 sets the current portion of the script 156 to be the next unprocessed or unexecuted portion of the script 156. Control then returns to block 505 where the next current portion of the script 156 executes, as previously described above.

If the determination at block 510 is false, then execution of the script 156 did not encountered an error and the received response does match (is identical to) the expected response, so control continues to block 540, as previously described above.

Figure 6:
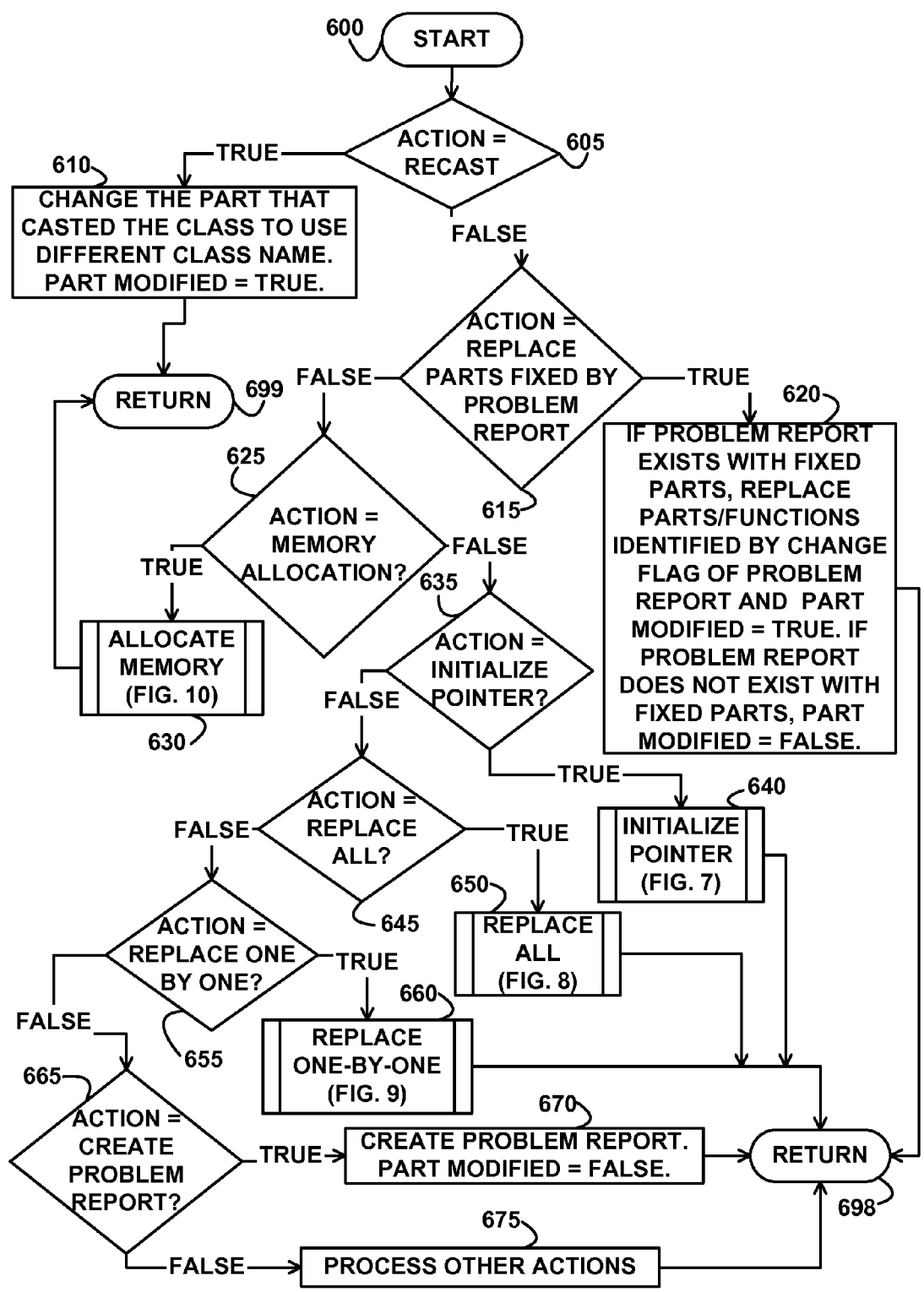
FIG. 6 depicts a flowchart of example processing for performing actions specified by rules for errors, according to an embodiment of the invention.

FIG. 6 depicts a flowchart of example processing for performing actions specified by rules 158 for errors, according to an embodiment of the invention. Control begins at block 600. Control then continues to block 605 where the controller 162 determines whether the current action is a recast action. If the determination at block 605 is true, then the current action is a recast action, so control continues to block 610 where the controller 162 changes the part that casted the class to use a different class name and sets an indication that a part has been modified/replaced by the processing. In an embodiment, a class cast exception is caused by the attempted execution of a statement or instruction that comprises an assignment statement of the contents of a source object or source storage location to a destination object or destination storage location, where the source object and the destination object have incompatible types or class names. In an embodiment, the controller 162 searches the parts for other assignment statements that use the same source object or destination object, finds the types or class names (either source, destination, or both) used in the other assignment statements, and changes the code of the assignment statement that causes the class cast exception to use the found types or class names, for the source object, the destination object, or both. Control then continues to block 699 where the logic of FIG. 6 returns to the invoker.

If the determination at block 605 is false, then the current action is not a recast action, so control continues to block 615 where the controller 162 determines whether the current action is a replace parts fixed by a problem report action. If the determination at block 615 is true, then the current action is a replace parts fixed by a problem report action, so control continues to block 620 where, if a problem report record exists for the error with fixed parts, the controller 162 replaces the parts/functions identified by the change flag of the problem report record with the same part or function within the part from the previous version and sets an indication that a part has been modified/replaced by the processing of the action. If a problem report record does not exist with fixed parts, the controller 162 sets an indication that a part has not been modified/replaced by the processing of the action. Control then continues to block 698 where the logic of FIG. 6 returns to the invoker.

If the determination at block 615 is false, then the current action is not a replace parts fixed by a problem report action, so control continues to block 625 where the controller 162 determines whether the current action is a memory allocation action. If the determination at block 625 is true, then the current action is a memory location action, so control continues to block 630 where the controller 162 processes the memory allocation action, as further described below with reference to FIG. 10. Control then continues to block 699 where the logic of FIG. 6 returns to the invoker.

If the determination at block 625 is false, then the current action is not a memory allocation action, so control continues to block 635 where the controller 162 determines whether the action is an initialize pointer action. If the determination at block 635 is true, then the current action is an initialize pointer action, so control continues to block 640 where the controller 162 processes the initialize pointer action, as further described below with reference to FIG. 7. Control then continues to block 698 where the logic of FIG. 6 returns to the invoker.

If the determination at block 635 is false, then the current action is not an initialize pointer action, so control continues to block 645 where the controller 162 determines whether the current action is a replace all parts action. If the determination at block 645 is true, then the current action is a replace all parts action, so control continues to block 650 where the controller 162 processes the replace all parts actions, as further described below with reference to FIG. 8. Control then continues to block 698 where the logic of FIG. 6 returns to the invoker.

If the determination at block 645 is false, then the current action is not a replace all parts action, so control continues to block 655 where the controller 162 determines whether the current action is a replace parts one-by-one action. If the determination at block 655 is true, then the current action is a replace parts one-by-one action, so control continues to block 660 where the controller 162 processes the replace parts one-by-one action. Control then continues to block 698 where the logic of FIG. 6 returns to the invoker.

If the determination at block 655 is false, then the current action is not a replace parts one-by-one action, so control continues to block 665 where the controller 162 determines whether the current action is a create problem report action. If the determination at block 665 is true, then the current action is a create problem report action, so control continues to block 670 where the controller 162 creates a record in the problem reports that specifies the error and sets an indication that a part has not been modified/replaced by the processing of the action. Control then continues to block 698 where the logic of FIG. 6 returns to the invoker. If the determination at block 665 is false, then the current action is not a create problem report action, so control continues to block 675 where the controller 162 processes other actions. Control then continues to block 698 where the logic of FIG. 6 returns.

Figure 7:
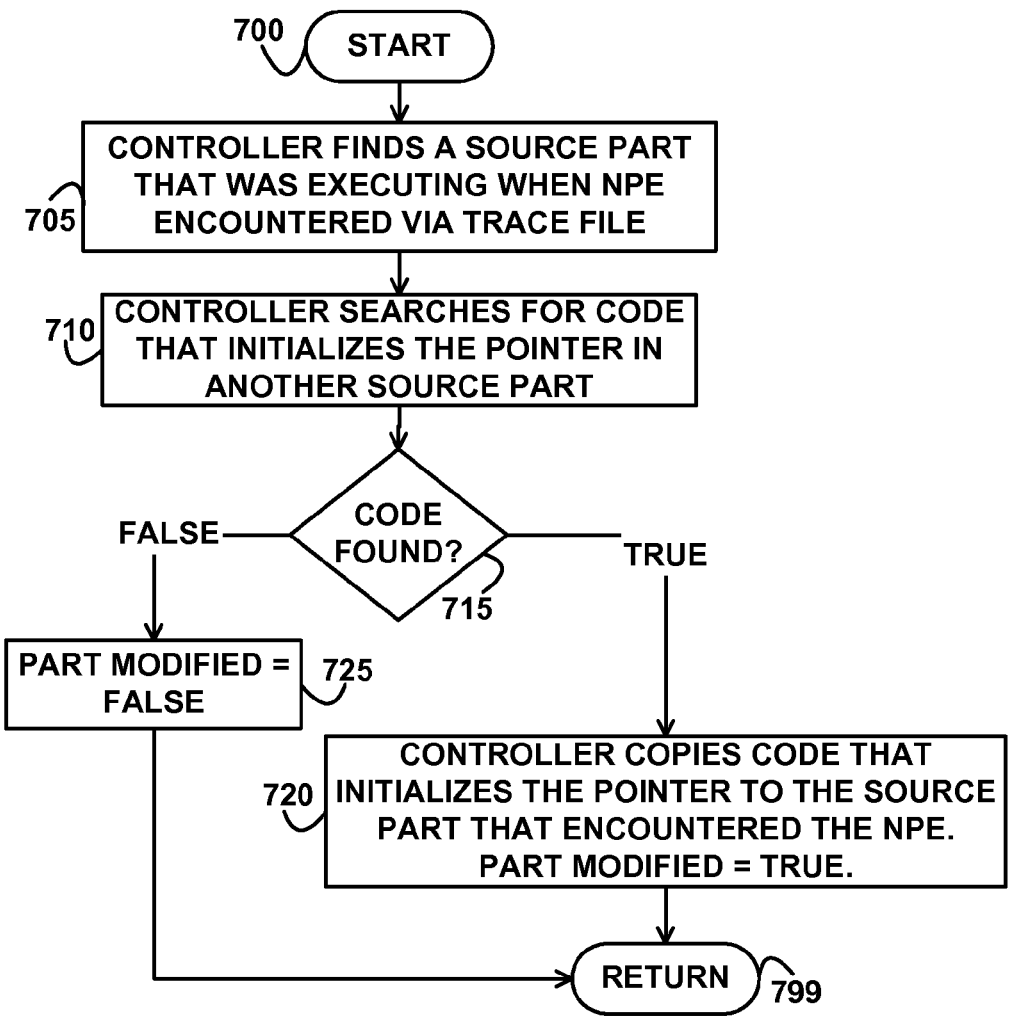
FIG. 7 depicts a flowchart of example processing for adding code to a part to initialize a pointer, according to an embodiment of the invention.

FIG. 7 depicts a flowchart of example processing for adding code to a part to initialize a pointer, according to an embodiment of the invention. Control begins at block 700. Control then continues to block 705 where the controller 162 finds, via a trace file, a source part that was executing when the null pointer exception was encountered. In various embodiments, the trace file identifies currently executing functions, instructions, or parts or comprises a call stack or invocation stack, comprising identifiers of executing modules, procedures, functions, methods, or parts and parameters and/or local data used thereby. Control then continues to block 710 where the controller 162 searches the source parts 152 for initialization code that initializes the same pointer that had a null value that caused the null pointer exception. Control then continues to block 715 where the controller 162 determines whether initialization code was found that initializes the same pointer. If the determination at block 715 is true, then initialization code that initializes the pointer was found, so control continues to block 720 where the controller 162 copies the found initialization code to the source part that encountered the null pointer exception, to a location prior to the access code that reads the null pointer, which caused the null pointer exception. The controller 162 further sets an indication that a part has been modified by the processing of the action. Control then continues to block 799 where the logic of FIG. 7 returns to the invoker.

If the determination at block 715 is false, then initialization code that initializes the pointer was not found, so control continues to block 725 where the controller 162 sets an indication that a part has not been modified/replaced by the processing of the action. Control then continues to block 799 where the logic of FIG. 7 returns to the invoker.

Figure 8:
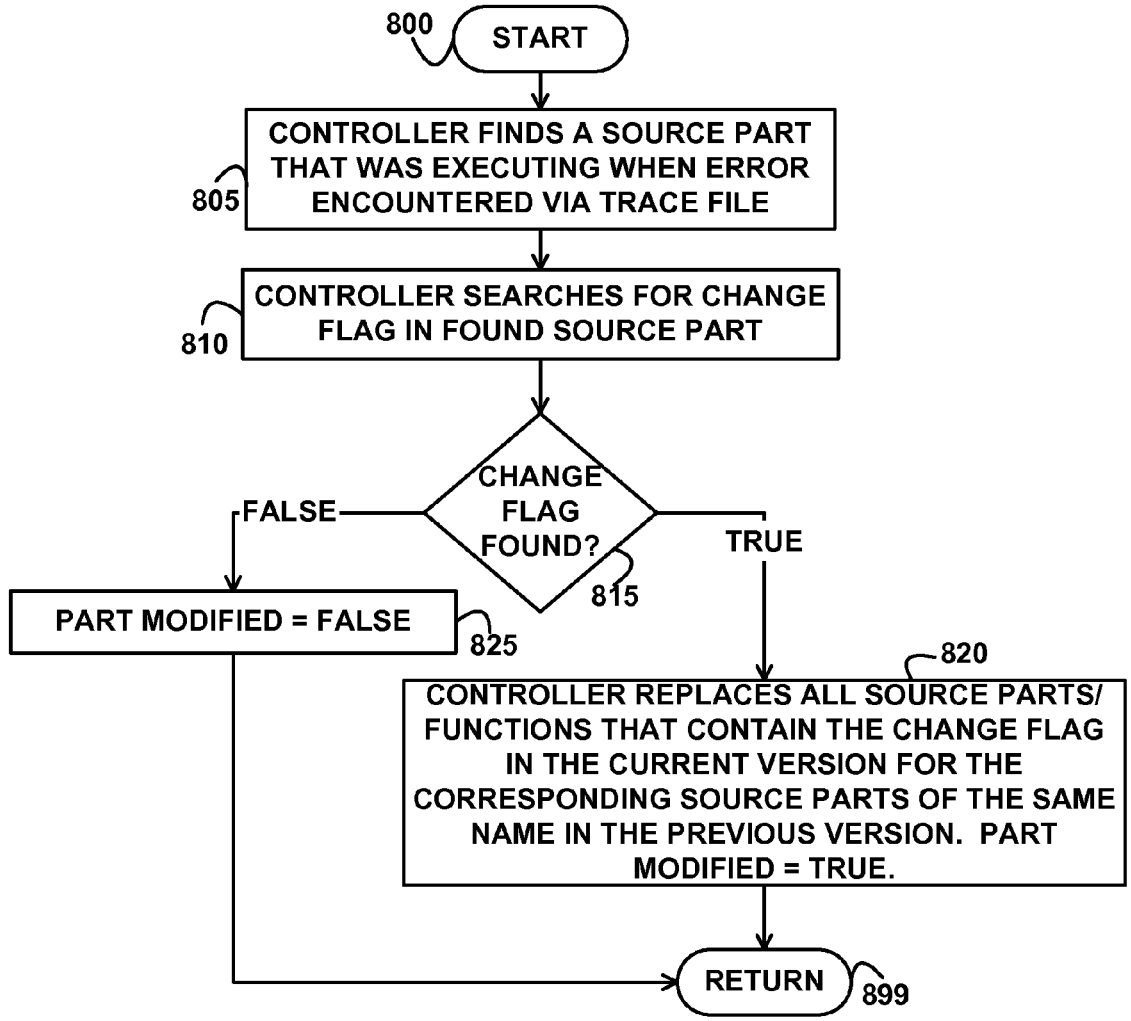
FIG. 8 depicts a flowchart of example processing for replacing all parts, according to an embodiment of the invention.

FIG. 8 depicts a flowchart of example processing for replacing all parts, according to an embodiment of the invention. Control begins at block 800. Control then continues to block 805 where the controller 162 finds, via a trace file, a found source part that was executing when the error was encountered by the script 156. Control then continues to block 810 where the controller 162 searches for a change flag in the found source part. Control then continues to block 815 where the controller 162 determines whether the change flag was found. If the determination at block 815 is true, then a change flag was found in the source part, so control continues to block 820 where the controller 162 replaces all source parts/functions that contain the change flag in the current version with the corresponding source parts/functions that have the same name in the previous version and sets an indication that a part has been modified/replaced by the processing of the action. Control then continues to block 899 where the logic of FIG. 8 returns to the invoker.

If the determination at block 815 is false, then a change flag was not found in the source part that was executing when the error was encountered, so control continues to block 825 where the controller 162 sets an indication that a part has not been modified/replaced by the processing of the action. Control then continues to block 899 where the logic of FIG. 8 returns to the invoker.

Figure 9:
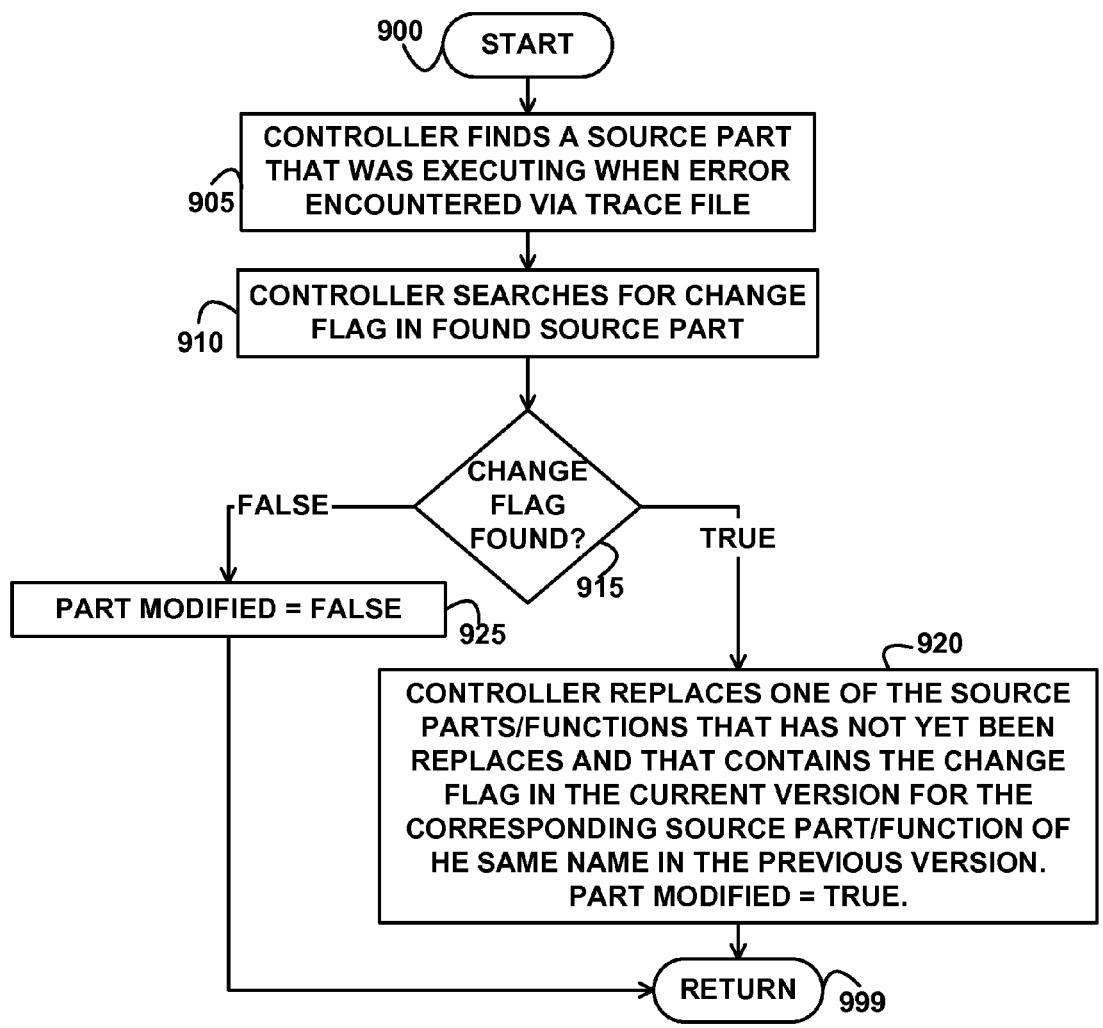
FIG. 9 depicts a flowchart of example processing for replacing parts one-by-one, according to an embodiment of the invention.

FIG. 9 depicts a flowchart of example processing for replacing parts one-by-one, according to an embodiment of the invention. Control begins at block 900. Control then continues to block 905 where the controller 162 finds, via a trace file, a found source part that was executing when error encountered. Control then continues to block 910 where the controller 162 searches for a change flag in the found source part. Control then continues to block 915 where the controller 162 determines whether the change flag was found. If the determination at block 915 is true, then a change flag was found in the source part, so control continues to block 920 where the controller 162 replaces one of the source parts/functions that has not yet been replaced and that is identified by the change flag in the current version for the corresponding source part/function with the same name in the previous version and sets an indication that a part has been modified/replaced by the processing of the action. Control then continues to block 999 where the logic of FIG. 9 returns to the invoker.

If the determination at block 915 is false, then a change flag was not found in the source part that was executing when the error was encountered, so control continues to block 925 where the controller 162 sets an indication that a part has not been modified/replaced by the processing of the action. Control then continues to block 999 where the logic of FIG. 9 returns to the invoker.

Figure 10:
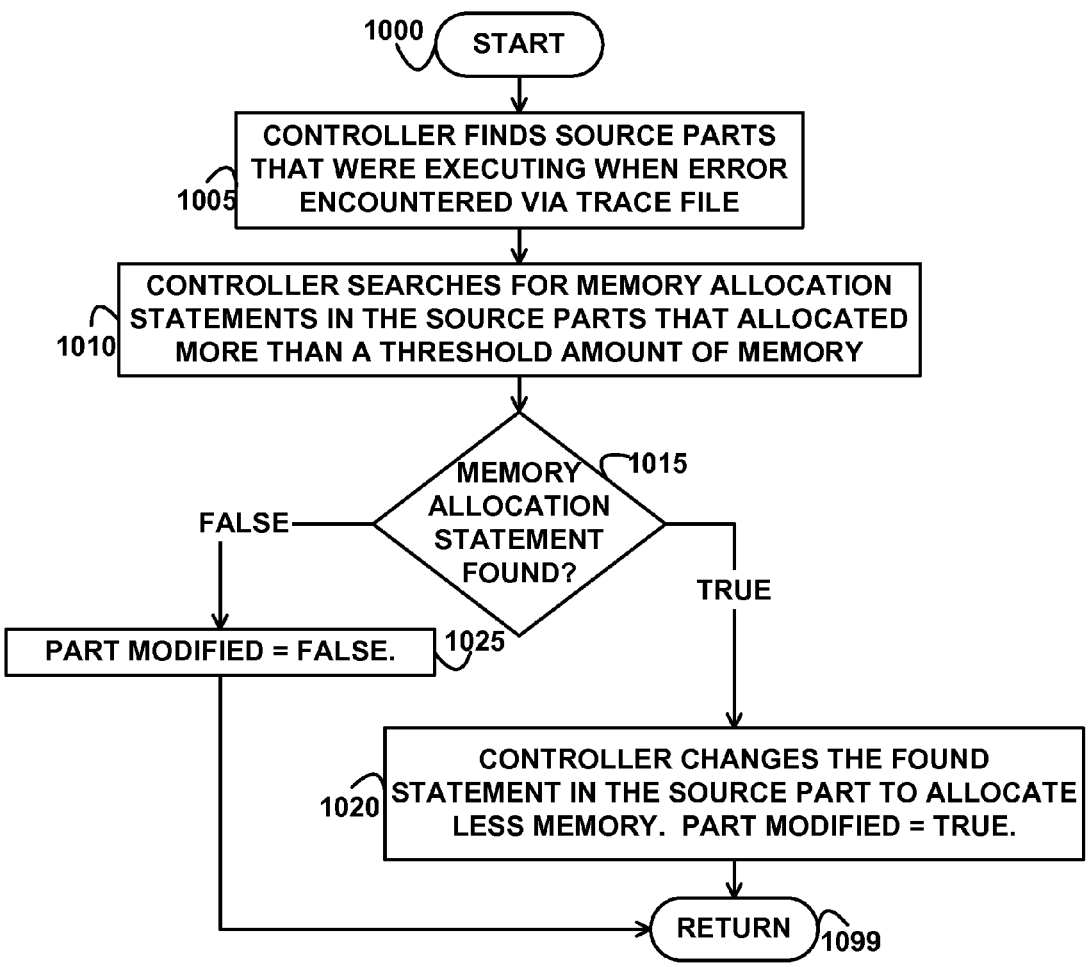
FIG. 10 depicts a flowchart of example processing for modifying code in a part to allocate memory, according to an embodiment of the invention.

FIG. 10 depicts a flowchart of example processing for modifying code in a part to allocate memory, according to an embodiment of the invention. Control begins at block 1000. Control then continues to block 1005 where the controller 162 finds, via a trace file, the source parts that were executing when the error was encountered. Control then continues to block 1010 where the controller 162 searches for memory allocation statements in the found source parts that, when executed, allocate more than a threshold amount of the memory 102. Control then continues to block 1015 where the controller 162 determines whether a memory allocation statement (in the source parts that were executing when the error was encountered) was found that allocated more than a threshold amount of the memory 102. In various embodiments, the threshold amount of memory is set by the designer of the controller 162, by the designer of the source parts, by a system administrator, or by a user via the user I/O device 121. In another embodiment, the controller 162 receives a specification of the threshold amount of memory from the client computer 132 via the network 130 or from an application that executes on the processor 101. If the determination at block 1015 is true, then a memory allocation statement (in the found source parts that were executing when the error was encountered) was found that allocated more than a threshold amount of the memory 102, so control continues to block 1020 where the controller 162 changes the found statement in the source part to allocate less memory (when executed) and sets an indication that a part has been modified by the processing of the action to be true. Control then continues to block 1099 where the logic of FIG. 10 returns to the invoker.

If the determination at block 1015 is false, then a memory allocation statement (in the found source parts that were executing when the error was encountered) was not found that allocated more than a threshold amount of the memory 102, so control continues to block 1025 where the controller 162 sets an indication that a part has not been modified/replaced by the processing of the action. Control then continues to block 1099 where the logic of FIG. 10 returns to the invoker.

Figure 11:
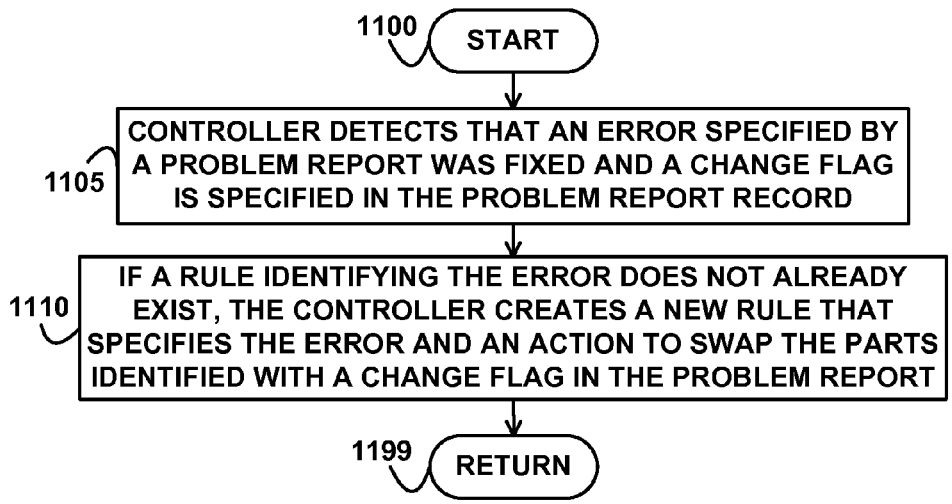
FIG. 11 depicts a flowchart of example processing for creating rules, according to an embodiment of the invention.

FIG. 11 depicts a flowchart of example processing for creating rules, according to an embodiment of the invention. In an embodiment, the logic of FIG. 11 executes concurrently, substantially simultaneously, or interleaved with the logic of FIGS. 5, 6, 7, 8, 9, and 10, on the same or a different processor via multi-tasking, multi-processing, or multi-threading techniques. Control begins at block 1100. Control then continues to block 1105 where the controller 162 detects that an error specified by a problem report has been fixed and a change flag is specified in the problem report record of the fixed error. Control then continues to block 1110 where, if a rule identifying the error does not already exist, the controller 162 creates a new record in the rule 158 that specifies the error and an action to replace the parts identified with a change flag in the problem report record. Control then continues to block 1199 where the logic of FIG. 11 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A computer-implemented method comprising:
in response to an error encountered by a test of a program, finding the error in a rule that specifies an action from among a plurality of rules, each rule specifying a respective at least one action to be invoked in response to occurrence of a corresponding error of a plurality of errors;
selecting a part in the program in response to the action;
modifying the part in the program in response to the selecting and in response to the action;
re-executing the test on the program that comprises part that was modified by the modifying;
wherein at least one rule of said plurality of rules specifies iteratively performing the actions of:
 (a) selecting one or more parts in the program which have changed with respect to a prior version of the program,
 (b) replacing the selected one or more parts with a prior version of the one or more parts from the prior version of the program,
 (c) re-executing the test on the program that comprises the one or more parts that were replaced by (b),
 (d) determining whether the corresponding error occurs when performing (c), and
 (e) repeating steps (a)-(d) until a part which causes the corresponding error to occur during testing is identified;
generating a problem report for output to a user; and
if the error is uncharacterized, creating a new rule and a new action that specifies replacing the part that was fixed in response to the error, after the part was fixed.

2. The method of claim 1, wherein the modifying the part further comprises:
adding initialization code to initialize a pointer in response to the action that specifies searching for the initialization code.

3. The method of claim 1, wherein the modifying the part further comprises:
changing the part that casted a class to use a different case name in response to the action that specifies recasting in response to a class cast exception.

4. The method of claim 1, wherein the selecting further comprises:
selecting the part that was executing at a time that the error was encountered.

5. The method of claim 4, further comprising:
finding a change flag that identifies the part that was executing at the time the error was encountered;
selecting a plurality of parts that are identified by the change flag;
modifying the plurality of parts in the program; and
re-executing the test on the program that comprises the plurality of parts that were modified.

6. A non-transitory computer-readable storage medium encoded with instructions, wherein the instructions when executed comprise:
in response to an error encountered by a test of a program, finding the error in a rule that specifies an action from among a plurality of rules, each rule specifying a respective at least one action to be invoked in response to occurrence of a corresponding error of a plurality of errors;
selecting a part in the program in response to the action;
modifying the part in the program in response to the selecting and in response to the action;
re-executing the test on the program that comprises part that was modified by the modifying;
wherein at least one rule of said plurality of rules specifies iteratively performing the actions of:
 (a) selecting one or more parts in the program which have changed with respect to a prior version of the program,
 (b) replacing the selected one or more parts with a prior version of the one or more parts from the prior version of the program,
 (c) re-executing the test on the program that comprises the one or more parts that were replaced by (b),
 (d) determining whether the corresponding error occurs when performing (c), and
 (e) repeating steps (a)-(d) until a part which causes the corresponding error to occur during testing is identified;
generating a problem report for output to a user; and
if the error is uncharacterized, creating a new rule and a new action that specifies replacing the part that was fixed in response to the error, after the part was fixed.

7. The non-transitory computer-readable storage medium of claim 6, wherein the modifying the part further comprises:
adding initialization code to initialize a pointer in response to the action that specifies searching for the initialization code.

8. The non-transitory computer-readable storage medium of claim 6, wherein the modifying the part further comprises:
changing the part that casted a class to use a different case name in response to the action that specifies recasting in response to a class cast exception.

9. The non-transitory computer-readable storage medium of claim 6, wherein the selecting further comprises:
selecting the part that was executing at a time that the error was encountered.

10. The non-transitory computer-readable storage medium of claim 9, further comprising:
finding a change flag that identifies the part that was executing at the time the error was encountered;
selecting a plurality of parts that are identified by the change flag;
modifying the plurality of parts in the program; and
re-executing the test on the program that comprises the plurality of parts that were modified.

11. A computer comprising:
a processor; and
memory communicatively coupled to the processor, wherein the memory is encoded with instructions, and wherein the instructions when executed on the processor comprise
in response to an error encountered by a test of a program, finding the error in a rule that specifies an action from among a plurality of rules, each rule specifying a respective at least one action to be invoked in response to occurrence of a corresponding error of a plurality of errors;
selecting a part in the program in response to the action;
modifying the part in the program in response to the selecting and in response to the action;
re-executing the test on the program that comprises part that was modified by the modifying;
wherein at least one rule of said plurality of rules specifies iteratively performing the actions of:

(a) selecting one or more parts in the program which have changed with respect to a prior version of the program,
(b) replacing the selected one or more parts with a prior version of the one or more parts from the prior version of the program,
(c) re-executing the test on the program that comprises the one or more parts that were replaced by (b),
(d) determining whether the corresponding error occurs when performing (c), and
(e) repeating steps (a)-(d) until a part which causes the corresponding error to occur during testing is identified;

generating a problem report for output to a user; and if the error is uncharacterized, creating a new rule and a new action that specifies replacing the part that was fixed in response to the error, after the part was fixed.

12. The computer of claim 11, wherein the modifying the part further comprises:

adding initialization code to initialize a pointer in response to the action that specifies searching for the initialization code.

13. The computer of claim 11, wherein the modifying the part further comprises:

changing the part that casted a class to use a different case name in response to the action that specifies recasting in response to a class cast exception.

14. The computer of claim 11, wherein the selecting further comprises:

selecting the part that was executing at a time that the error was encountered.

15. The computer of claim 14, wherein the instructions further comprise:

finding a change flag that identifies the part that was executing at the time the error was encountered;

selecting a plurality of parts that are identified by the change flag;

modifying the plurality of parts in the program; and re-executing the test on the program that comprises the plurality of parts that were modified.

\* \* \* \* \*